UNITED STATES PATENT OFFICE.

LUDWIG SCHAD, OF BERLIN, GERMANY.

PRODUCTION OF COLORING-MATTER.

SPECIFICATION forming part of Letters Patent No. 354,746, dated December 21, 1886.

Application filed August 20, 1886. Serial No. 211,418. (No specimens.) Patented in Germany March 31, 1886, and in England July 28, 1886, No. 9,754.

*To all whom it may concern:*

Be it known that I, LUDWIG SCHAD, doctor of philosophy, a subject of the King of Prussia, residing at Berlin, Prussia, German Empire, have invented certain new and useful Improvements in Coloring-Matters; and I do hereby declare the following to be a full, clear, and exact description of the invention, such as will enable others skilled in the art to which it appertains to make and use the same.

When para-tolyl-beta-naphthylamine is combined with the diazo combination of azo-benzol-disulpho-acid, a color is formed which dyes wool from an acidulated bath a bluish-black shade. This color is produced as follows: The para-tolyl-beta-naphthylamine is dissolved in a twenty-fold quantity of alcohol and mixed with the equivalent quantity of muriatic acid of 20° Baumé. Then the equivalent quantity of diazo-azo-benzol-disulpho-acid is added, which causes the formation of the free acid of the color. This acid must be salted out with common salt, filtered, and washed until the filtrate runs off colorless. The residue on the filter is taken up with a solution of soda, filtered, and the color salted out, when it separates in fine tabular crystals. It is then filtered, pressed, and dried.

Having thus fully described my invention, what I claim as new, and desire to secure by Letters Patent, is—

A bluish-black coloring-matter produced by the combination of the disulpho acid of diazo-azo-benzol with para-tolyl-beta-naphthylamine, as described above.

In testimony whereof I affix my signature in presence of two witnesses.

LUDWIG SCHAD.

Witnesses:
    PAUL BOECK,
    B. ROI.